United States Patent
Wang et al.

(10) Patent No.: US 12,013,248 B2
(45) Date of Patent: Jun. 18, 2024

(54) METHOD AND DEVICE FOR DETERMINING A NAVIGATION PROFILE FOR A VEHICLE IN A GEOGRAPHICAL AREA

(71) Applicant: GRABTAXI HOLDINGS PTE. LTD., Singapore (SG)

(72) Inventors: Zehua Wang, Beijing (CN); Xiaocheng Huang, Singapore (SG); Nuo Xu, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/026,248

(22) PCT Filed: Sep. 15, 2021

(86) PCT No.: PCT/SG2021/050560
§ 371 (c)(1),
(2) Date: Mar. 14, 2023

(87) PCT Pub. No.: WO2022/066098
PCT Pub. Date: Mar. 31, 2022

(65) Prior Publication Data
US 2023/0324187 A1 Oct. 12, 2023

(30) Foreign Application Priority Data
Sep. 22, 2020 (SG) .......................... 10202009324U

(51) Int. Cl.
*G01C 21/34* (2006.01)
*B60W 60/00* (2020.01)

(52) U.S. Cl.
CPC ... *G01C 21/3446* (2013.01); *B60W 60/00253* (2020.02); *G01C 21/3438* (2013.01);
(Continued)

(58) Field of Classification Search
CPC ............ G01C 21/3446; G01C 21/3438; G01C 21/3492; B60W 60/00253; B60W 2556/40; B60W 2556/50
See application file for complete search history.

(56) References Cited

U.S. PATENT DOCUMENTS 7,706,964 B2  4/2010 Horvitz et al.
8,126,641 B2  2/2012 Horvitz
(Continued)

FOREIGN PATENT DOCUMENTS

EP        1397643         10/2009
WO   WO-2006/082136      8/2006

OTHER PUBLICATIONS

International Search Report for App. No. PCT/SG2021/050560, dated Oct. 21, 2021 (3 pages).
(Continued)

*Primary Examiner* — Rami Khatib
(74) *Attorney, Agent, or Firm* — Buckley, Maschoff & Talwalkar LLC

(57) ABSTRACT

Aspects concern a method for determining a navigation profile for a vehicle in a geographical area, comprising obtaining a road network, initializing a navigation map by assigning an initial speed to each road segment of the road network, training the navigation map using training data comprising a training route for each of a multiplicity of trips by, if the number of trips for which a road segment is in the training route but not in the determined route is above the first threshold, assigning a higher speed to the road segment, and, if the number of trips for which a road segment is in the determined route but not in the training route is above the second threshold, assigning a lower speed to the road
(Continued)

segment, and determining a navigation profile including a route for a vehicle in the geographical area using the trained navigation map.

17 Claims, 5 Drawing Sheets

(52) U.S. Cl.
CPC ..... *G01C 21/3492* (2013.01); *B60W 2556/40* (2020.02); *B60W 2556/50* (2020.02)

(56) References Cited

U.S. PATENT DOCUMENTS

| | | | |
|---|---|---|---|
| 9,280,894 | B2 | 3/2016 | Chapman et al. |
| 9,829,332 | B2 | 11/2017 | Hilbrandie et al. |
| 2017/0328725 | A1 | 11/2017 | Schlesinger et al. |
| 2020/0132479 | A1 | 4/2020 | Khasis |
| 2023/0139003 | A1* | 5/2023 | Bhasme .............. B60L 15/2045 701/533 |

OTHER PUBLICATIONS

Written Opinion for App. No. PCT/SG2021/050560, dated Oct. 21, 2021 (5 pages).
International Preliminary Report on Patentability for App. No. PCT/SG2021/050560, dated Mar. 28, 2023 (6 pages).
Tian et al., "A Dynamic Travel Time Estimation Model Based on Connected Vehicles", Hindawi Publishing Corporation Mathematical Problems in Engineering, vol. 2015, Article ID 903962, pp. 1-11.
Luxen et. al.: "Real-time routing with OpenStreetMap data". In Proceedings of the 19th ACM SIGSPATIAL International Conference on Advances in Geographic Information Systems, 513-516. 2011.
Ceikute et. al.: "Routing service quality—local driver behavior versus routing services." In Proceedings of IEEE International Conference on Mobile Data Management, 97-106. 2013.
Geisberger et. al.: "Contraction Hierarchies: Faster and Simpler Hierarchical Routing in Road Networks." In McGeoch C.C. (eds) Experimental Algorithms. WEA 2008. Lecture Notes in Computer Science, vol. 5038. Springer, Berlin, Heidelberg. 2008.
Guo et. al.: Learning to Route with Sparse Trajectory Sets. In IEEE 34th International Conference on Data Engineering (ICDE), 1073-1084. 2018.

* cited by examiner

METHOD AND DEVICE FOR DETERMINING A NAVIGATION PROFILE FOR A VEHICLE IN A GEOGRAPHICAL AREA

TECHNICAL FIELD

Various aspects of this disclosure relate to methods and devices for determining a navigation profile for a vehicle in a geographical area.

BACKGROUND

The quality of an e-hailing service which enables customers to hail taxis using their smartphones largely depends on how accurate the determination of navigation profiles, i.e. the routes taken or to be taken by the e-hailing service's vehicles is since the determination of these navigation profiles is the basis for various parameters which are necessary for efficient operation like the allocation of vehicles to trips and navigation of vehicles. However, road networks may be complex and there may be many parameters which have an impact on whether a road is taken or should be taken for a trip, e.g. whether a lot of traffic has to be expected on the road, there is a speed limit, the road is private, the road requires payment of a toll etc. Therefore, approaches for determining navigation profiles which allow accurate prediction of routes which are taken or which should be taken are desirable.

SUMMARY

Various embodiments concern a method for determining a navigation profile for a vehicle in a geographical area, including obtaining a road network for the geographical area, the road network including road segments connecting locations in the geographical area, initializing a navigation map by assigning an initial speed to each road segment of the road network, training the navigation map using training data including a training route for each of a multiplicity of trips by determining whether a number of trips for which a road segment is in the training route but not in the determined route is above a first threshold and, if the number of trips for which a road segment is in the training route but not in the determined route is above the first threshold, assigning a higher speed to the road segment, determining whether a number of trips for which a road segment is in the determined route but not in the training route is above a second threshold and, if the number of trips for which a road segment is in the determined route but not in the training route is above the second threshold, assigning a lower speed to the road segment and determining a navigation profile including a route for a vehicle in the geographical area using the trained navigation map.

According to one embodiment, the first threshold and the second threshold depend on the number of trips for which the road segment is in the determined route, the training route or both.

According to one embodiment, the method includes determining whether the number of trips for which a road segment is in the training route but not in the determined route is above the first threshold and a third threshold and, if the number of trips for which a road segment is in the training route but not in the determined route is above the first threshold and the third threshold, assigning a higher speed to the road segment, and determining whether the number of trips for which a road segment is in the determined route but not in the training route is above a second threshold and a fourth threshold and, if the number of trips for which a road segment is in the determined route but not in the training route is above the second threshold and the fourth threshold, assigning a lower speed to the road segment, wherein the first threshold and the second threshold are absolute thresholds and wherein the third threshold and the fourth threshold are relative thresholds depending on the number of trips for which the road segment is in the determined route, the training route or both.

According to one embodiment, initializing the navigation map includes assigning each road segment of the road network to a road segment speed group and iteratively training the navigation map includes for each road segment speed group, determining an average deviation between the routes determined using the navigation map and the training routes and tuning the speed of the road segment speed group to reduce the average deviation and, for each road segment of the road segment speed group, determining whether a number of trips for which a road segment is in the training route but not in the determined route is above a first threshold and assigning the road segment to a road segment speed group for a higher speed than the speed of the road segment speed group if the number of trips for which the road segment is in the training route but not in the determined route is above a first threshold and determining whether a number of trips for which a road segment is in the determined route but not in the training route is above a second threshold and assigning the road segment to a road segment speed group for a lower speed than the speed of the road segment speed group if the number of trips for which the road segment is in the determined route but not in the training route is above a second threshold.

According to one embodiment, the method further includes, if neither the number of trips for which the road segment is in the training route but not in the determined route is above the first threshold nor a number of trips for which the road segment is in the determined route but not in the training route is above the second threshold, assigning the road segment to a road segment speed group having the same speed as the road segment speed group the road segment is from.

According to one embodiment, tuning the speed of the road segment speed group includes tuning the speed within a tuning range.

According to one embodiment, if the road segment speed group is a road segment speed group for a higher speed tuning the speed of the road segment speed group includes increasing the speed of the road segment speed group.

According to one embodiment, if the road segment speed group is a road segment speed group for a lower speed tuning the speed of the road segment speed group includes decreasing the speed of the road segment speed group.

According to one embodiment, the method includes generating a tuning tree having a node for each road segment speed group, wherein iteratively training the navigation map includes traversing the nodes of the tuning tree in a depth first search order and perform, when a node is being traversed, for the road segment speed group of the node, the tuning of the speed of the road segment speed group and, for each road segment of the road segment speed group of the node, the determining whether a number of trips for which a road segment is in the training route but not in the determined route is above a first threshold and the assigning the road segment to a road segment speed group for a higher speed than the speed of the road segment speed group if the number of trips for which the road segment is in the training route but not in the determined route is above a first threshold and the determining whether a number of trips for which a road segment is in the determined route but not in the training route is above a second threshold and the assigning the road segment to a road segment speed group for a lower speed than the speed of the road segment speed group if the number of trips for which the road segment is in the determined route but not in the training route is above a second threshold.

According to one embodiment, the method includes, when a node is being traversed, generating a child node for a road segment speed group for a higher speed and generating a child node for a road segment speed group for a lower speed except for leaf nodes of the tuning tree.

According to one embodiment, the method further includes evaluating the smoothness of the trained navigation map and re-training the navigation map if the smoothness has worsened by more than a predetermined maximum amount in the training or over a predetermined number of iterations of the training.

According to one embodiment, obtaining the road network for the geographical area includes obtaining information about the location of roads in the geographical area and subdividing the roads into the road segments.

According to one embodiment, the locations in the geographical area connected by the road segments are crossings of the roads and subdividing the roads into road segments includes subdividing the roads at the crossings.

According to one embodiment, the method further includes navigating one or more vehicles by the determined navigation profile.

According to one embodiment, the method further includes transmitting the determined navigation profile to a vehicle and controlling the vehicle to follow the route included in the navigation profile.

According to one embodiment, a server computer is provided including a radio interface, a memory interface and a processing unit configured to perform the method of any one of the above embodiments.

According to one embodiment, a computer program element is provided including program instructions, which, when executed by one or more processors, cause the one or more processors to perform the method of any one of the above embodiments.

According to one embodiment, a computer-readable medium is provided including program instructions, which, when executed by one or more processors, cause the one or more processors to perform the method of any one of the above embodiments.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
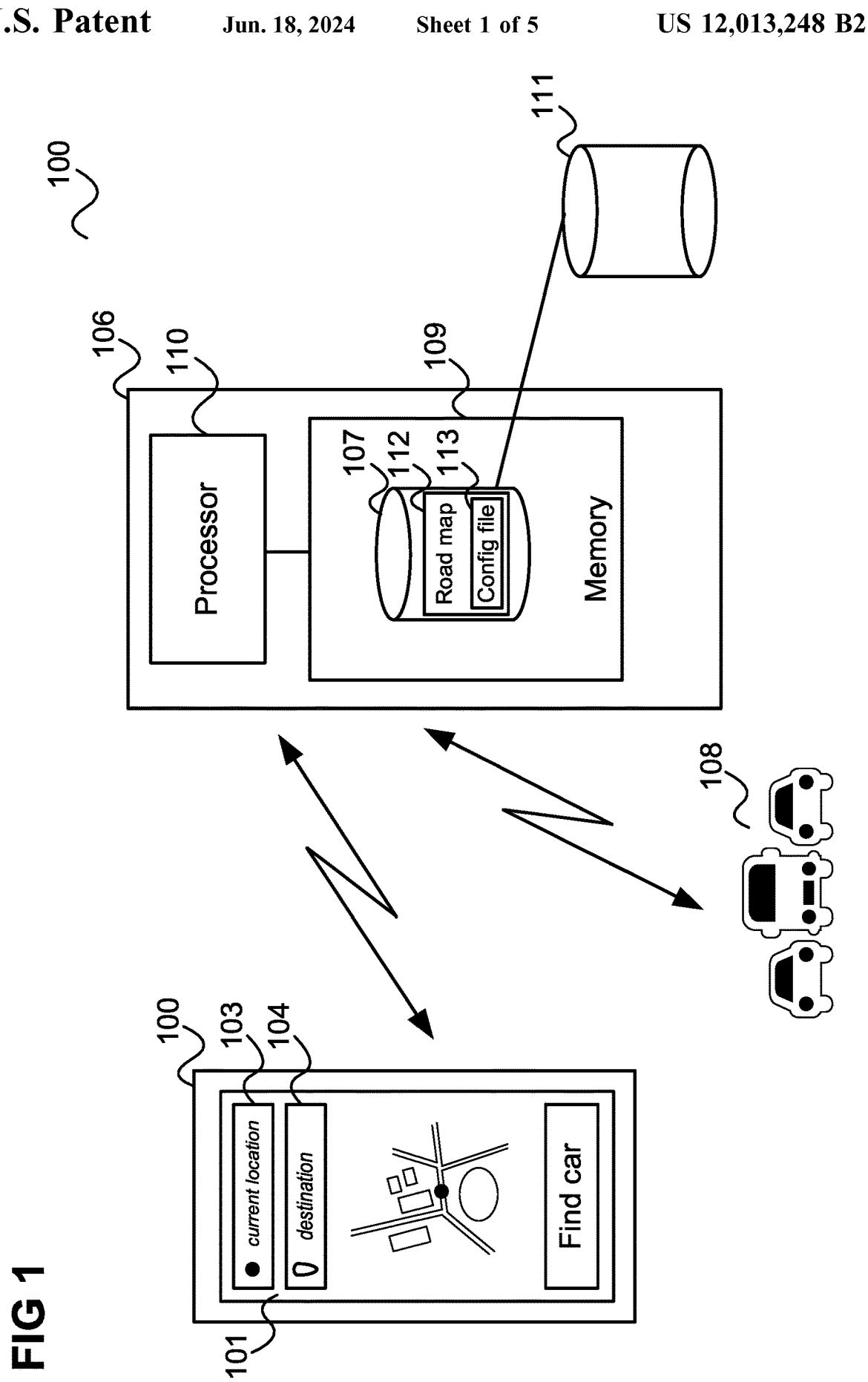
FIG. 1 shows a communication arrangement for usage of an e-hailing service including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the vicinity of the user's position (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 includes a database 107 having information about the current location of registered vehicles 108, about when they are expected to be free, about traffic jams etc. From this, a processor 110 of the server 106 selects the most suitable vehicle (if available, i.e. if the request can be fulfilled) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button. If the user accepts, the server 106 informs the selected vehicle 108 (or, equivalently, its driver), i.e. the vehicle the server 106 has allocated for fulfilling the transport request.

It should be noted while the server 106 is described as a single server, its functionality, e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

To determine all route-related information, like the most suitable driver and an estimate of the time when the driver will be there to pick up the user, a price of the ride and how long it will take to get to the destination, the processor 110 access a data base 107 storing map data including for example one or more navigation maps 112 indicating where roads are located, the allowed direction of travel, speed limits, etc.

The data base 107 is in this example implemented by a local memory 109 of the server computer 106. However, it may also be implemented at least partially externally to the server computer 106, e.g. in a cloud, and it may be filled by access to an external data base 111, e.g. an open route map information database such as OSM (Open Street Map).

The quality of navigation of the services' vehicles 108 is of big significance for ride-hailing service. An accurate navigated route is critical for many location-based services such as calculating accurate ETA/ETT (estimated time of arrival/travel), pricing, order dispatch and multiple point travel integration. Meanwhile, it can improve drivers' and customers' experience significantly since better routes will save time, avoid additional cost, avoid traffic, avoid restriction and provide customized routes. Furthermore, efficient navigation of a fleet of vehicles avoids traffic jams, risk of accidents, reduces fuel consumption, etc.

The server 106 may determine the above information (such as ETA and ETT) by estimating the route that the driver will take. The server 106 calculates the route using a navigation map 112, stored in data base 107.

A navigation map 112 can be transformed into a big routing graph which consists of points and weighted lines. Based on all the weights in the graph, there are several shortest path determination techniques which the server 106 may use to determine a route for a trip (between a starting location and a destination) such as Dijkstra and contraction hierarchies to search and calculate routes from origin to destination.

However, a driver may not always go along the shortest or fastest path. There are many influential factors (e.g. traffic, toll, restriction, familiarity, weather, traffic light, turn and so on) that may affect a driver's choice. Commonly the influential factors of navigation can be mapped into weights to tune the speed of a road or add time/cost penalties for the road (i.e. the edge of the routing graph). However, it is typically difficult to know every driver's preference and take all the actual local map conditions into account. So, according to one embodiment, the server 106 learns from historical data and tunes the speeds of roads of a navigation map 112. In other words, the server 106 uses historical data as training data for the navigation map 112. This allows the server 106 to estimate routes taken by drivers more accurately. The historical data includes routes taken by drivers and is stored in the data base 107. The route taken by a driver for a trip may be communicated from the driver's vehicle 108 to the server 106 (e.g. in form of a vehicle trace or driver trace, e.g. a GPS (Global Positioning System) trace) and the server 106 may store information specifying the route into the data base 107 to build up the historical data.

One approach for routing optimisation, i.e. for improving the estimation (or prediction or determination) of routes taken, or in other words, to improve the navigation map 112 in the sense that it better fits the actual geographical circumstances, is to learn the road type speed from historical data on road class level to learn, considering, for example, around 20 road classes such as motorway, trunk and so on (even if there may be millions of roads in a navigation map). The navigation map 112 may include a speed profile which specifies a speed for each road class, which means that the server 106 considers all the roads with the same class to have the same speed. The server 106 may tune the road class speeds for example by a grid search algorithm to improve route determination.

Although the routing optimisation at road class level can improve the prediction of routes taken (and similarly the navigation of vehicles in case the server 106 uses a determined route for navigating a vehicle 106), it is coarse-grained and the improvement is limited. Actually, not all the road's speed with the same road class is the same. For example, the speed of motorway in downtown and in suburb is typically different. Downtown motorway speed is slower than the speed in suburb in most conditions due to traffic.

Besides, the road-class level routing optimisation approach described above cannot address the issues of a road belonging to a private area road or being a toll road. In general, drivers would not or are not permitted to go through private areas. However, this is difficult to resolve by simply changing the speed in one road class as roads in private areas can have different road classes. Further, drivers would probably not choose toll roads if there is an alternative free route due to the extra cost of a toll road. In the same way, toll roads can have different road classes so this is also difficult to resolve with the routing optimization approach described above.

In view of the above issues, according to various embodiments, a more fine-grained routing optimisation approach, working at a speed class level, is provided to solve the above problems. Speed class level means one road class speed can be split into several speed classes. According to various embodiments, roads are split into road segments and the speeds of the road segments are tuned. This allows treating different roads with different speeds. In contrast, the road class level optimisation approach described above cannot split the road speed into different road segments speeds because the grid search only tunes the road speed, which means all the road segments' speeds of the road will be tuned simultaneously. The road segments are the basic elements including a road. They are for example generated made by a map editor to represent a road. They are very short in common. For example, for some short distance from one crossing to the next there may be only one segment, but generally there may be two or more segments between crossings if there are other map marks, e.g. as observed in the map, e.g. an OSM map. Thus, road segments can not only be from crossing to crossing as nodes may not only refer to crossings but can bear other road attributes (such as traffic light, a barrier, etc). A segment can be considered as topologically connecting two nodes on the graph. For definition of nodes, the same concept as for OSM maps may be used.

According to one embodiment, to split a road speed into different road segment speeds, the server 106 uses a tuning tree to explore different speed classes of one road class using a depth first search order. Every tree node of the tuning tree has several road segments with the same speed and same road class. The server 106 generates three children nodes for the node with higher, equal and lower speed, respectively, following a statistics and classification strategy described below in detail. The server 106 allocates all the road segments to the children nodes independently. In the end, the server 106 generates different speed classes for road segments. This speed class level approach allows resolving the issues mentioned above for the road class level approach (mostly because grid search cannot scale well to road segments but a tuning tree can scale as it introduces speed classes). This allows improvement of route prediction (e.g. in terms of the offCourseRatio metric described below) for estimating routes drivers will take (e.g. for determination of ETA and ETT) or navigating (e.g. autonomous) vehicles or both. Furthermore, the speed class level approach generates classification information for each road class since it generates several speed classes for each road class. This provides insight to understand the behaviour of each road class (e.g., probably for same road class, those in downtown area tends to have lower speed). Additionally, the speed class level approach can be easily applied and scaled to different cities.

As described in more detail below, the server computer 106 may further use a regularization term to monitor the tuning results in order to avoid overfitting.

As explained above, the routing optimisation approach applied by the server 106 according to various embodiments can be seen to focus on the speed class level. Given training data which may contain millions of booking traces (i.e. recorded routes for booked trips, also referred to as "bookings" in the following), an initial version of the navigation map 112 including a road network and, according to one embodiment, a speed profile which specifies a speed of each road class, the server 106 takes the speed of each road class, adjusts the speed of each road segment in depth-first search order and generates a tuning tree. It stores the results in a customized speed configuration file 113 containing information about the tuned road segments and the optimized speed associated with the road segments. The server 106 may use this speed configuration file 113 for routing (route prediction and navigation) that is more accurate than routing using the initial version of the navigation map (which does not contain the speed configuration file). It should be noted that the speed configuration file 113 is seen as part of the navigation map 112 (but may nevertheless be a separate file associated with the navigation map 112). In addition to the information from the speed configuration file 113, the navigation map 112 specifies a road network containing the road segments whose speeds are defined by the speed configuration file 113.

According to various embodiments, the routing optimization approach includes a metric called offCourseRatio. The OffCourseRatio measures how much a determined (i.e. a route plan) deviates from a driver trace (i.e. a route taken by a driver). The value of the OffCourseRatio ranges from 0 (completely same) to 1 (completely deviated). The offCourseRatio may be regularly checked during training of the speed classes. For large amounts of training data involving training in multiple tuning iterations, for example, the average value of offCourseRatio may be checked in each tuning iteration.

As mentioned above, inputs to the routing optimization are training data and an original navigation map (possibly with original road speed classes). Training data are historical routes taken by drivers (e.g. driver trace data) in the geographical region covered by the navigation map. The navigation map is for example a navigation map for a city which allows determining a route plan of a trip based from the starting point and the destination point of the trip.

The server 106 initially calculates the original offCourseRatio (i.e. for the original navigation map). Then it generates a pseudo tree root and several child nodes which contain a set of map road segments separated by the original speed in descending order. Each road segment is related to the bookings that the driver trace covers that road segment.

Secondly, it starts to search at the first child node whose speed is the maximum as mentioned above. The search function is to use a strategy to perform statistics over the node's road segments and classify all the node's road segments into three subsets and mark them as three child nodes, e.g. also in speed descending order. The three subsets include a "higher", an "equal" and a "lower" subset which means the speed of a road segment moved to the next tree layer is assigned to the next layer subset depending on whether its speed is higher, equal or lower.

The server 106 then processes the next node according to depth first search. If the node's speed attribute is higher/lower, it increases/decreases the speed of the node's road segments by a tuning amount (within a tuning range) and updates the speed configuration file 113. Next, the server 106 uses the updated speed configuration file 113 to rebuild the navigation map 112, generate route plans for the training data (i.e. trips included in the training data) and calculates the resulting offCourseRatio. If the resulting offCourseRatio is lower than the one before tuning the speed, the server 106 updates it and writes the changed (i.e. tuned) speed to the speed configuration file 113 and stores it. After searching the tuning amount within the tuning range, which includes, for each tuning amount calculation of the resulting offCourseRatio and comparison with the resulting offCourseRatio of the previous tuning amount (starting from the untuned speeds), the server 106 gets a partially optimized road segment speed. It repeats performing statistics and classification to generate three child nodes in speed descending order and proceeds to the next tree layer continually.

In accordance with depth first search, when the down search reaches an end condition like a tree depth threshold or none of road segments being tuned etc., the server 106 stops proceeding to a deeper layer but continues processing with a brother node of the current node (i.e. the node processed last). If all its brother nodes have been processed, the search node returns to its parent's brother node on so on.

Thus, the server 106 generates a large tree whose nodes it has processed in depth first order. When this traverse process (including tuning the speeds at the nodes) is complete, the speed configuration file 113 holds the final result for the road segments speeds. After this process (which can be seen as training of the navigation map, specifically of the road segments speeds), in order to prevent overfitting, the server 106 may evaluate the smoothness of the generated navigation map with respect to the original map by a regularization term as described below. If the smoothness is not good, the server 106 may adjust input parameters (like the tuning range) and retrain the navigation map 112 until it gets better.

As a result of the navigation map training,

Covered road segments are reassigned to a multi speed class level, rather than having a road type speed. The more training data there is available, the more accurate is the route prediction using the trained navigation map.

The overall average offCourseRatio is guaranteed to be better than before training. Experiments show that it gets more than 15% improvement after tuning without overfitting in most cities using training data from driver traces of an e-hailing service. Thus, key OKR (objectives and key results) for an e-hailing service like ETT (estimated time of trip) and ETA (estimated time of arrival)/EDT (expected distance of trip) can be improved.

Most private area roads and toll roads are probably reflected in the trained navigation map. Typically, the speed of private road segments will decrease and meanwhile the speed of road segments in the vicinity of the private roads will increase since the majority of drivers will not go through the private area and go around (e.g. parallel) to it. If most drivers do not choose toll roads despite the high speed, that toll road segments' speed will typically decrease to avoid being routed.

The navigation map training is adaptable such that it may be applied under different conditions and using different parameters, e.g.:

Map type: city map, maps for routes for certain vehicles (e.g, 4-wheel maps, 2-wheel maps), nations, even customized maps.

Time range of training data: all week time or just peak/non-peak hour.

Tuning options: such as precision, tree depth, statistical decision conditions and so or Filter road, initial road order: some road types may be filtered (e.g. filtered out) or different initial orders may be used instead of speed descending order.

Furthermore, the navigation map training may be easily scaled up (e.g. to a higher number of road types) and the tuning, process may be intuitively interpreted.

In the following, one example of the road segment speed tuning process (i.e. navigation map training) is explained in detail.

For this, first, the representation of input and output data in this navigation map training is described.

1. Road Network (contained in navigation map 112)

A road network is a weighted graph G=(V, E, W), where the vertex set V consists of nodes, edge set E⊆V×V consists road segments, each of which is represented by start node and end node with direction and W contains the weight function, which maps each road segment to a duration. Without loss of generality, other information in the road network (such as turn restrictions, one-ways, etc.) is ignored in the following as it does not affect the following explanation. The metadata of a road network, including node and road segment attributes (node location, road segment distance, road class of each road segment, etc) and topology information is stored in addition to the road network in the navigation map.

2. Route Plan

A route plan $P=<v_1,v_2, \ldots, v_k>$ is a sequence of nodes where two consecutive nodes are connected by an edge. An equivalent representation is $P=<e_1, e_2, \ldots, e_k>$ where for any two consecutive road segments $e_i=(o_i,d_i)$ and $e_{i+1}=(o_{i+1},d_{i+1})$ with $d_i=o_{i+1}$.

3. Driver's Trace

A driver's trace is a time-ordered sequence of GPS pings capturing the movement of a vehicle 108, where a GPS ping is represented as a triplet (ts, lat, lon) captures the location (composed as latitude lat and longitude lon) of the vehicle at a timestamp ts. The distance between two locations is assumed to be haversine distance. The time gap between two consecutive pings is usually around one second.

4. Speed Profile

A speed profile contains the mapping from road class to speed. In OSM (Open Street Map), each road segment contains a road class which is used to identify the type of the road (e.g., motorway, primary road, etc.). The weight (duration) of each road segment can be easily derived from distance (the length between start node and end node) and speed (obtained from speed profile based on the road class it belongs to).

5. Training Data

Training data D is used for tuning. It contains many historical booking (i.e. e-hailing trip) IDs, start and end points, their driver traces. An original route plan may be determined for each booking using the original (i.e. untrained) navigation map (i.e. using the road speed profile but not the road segment speeds determined in course of the training).

6. Configuration file

The speed configuration file 113 is the resulting customized road segment level speed file. It is the result file of the navigation map training. It contains multi-road segments information lines. Each line consists of road segment's start point, end point and tuned speed. For determining a route, the server's route engine first loads the speed profile of the navigation map 112 to obtain all the road class speeds. Each road segment is initially given the road class speed in the speed profile of the road class to which the road segment belongs. After the training, the speed of the road segments are given by those in the speed configuration file 113. Thus, the routing speed of road segments of the same road class may have different values, which may generate better routing results.

7. Control Parameters

Control parameters are a set of parameters controlling the training. They for example contain training data time range, tuning tree depth, tuning precision, road class whitelist, tuning maximum speed, tuning step, statistical distribution percentage threshold, minimum bookings, map city, map wheels, map version, phase (pickup or drop-off) and so on. They allow to adapt the training to different cities, different time and different training requests.

The "OffCourseRatio" is the metric to measure how much a determined route plan (i.e. a determined route) P deviates from the driver's trace $\hat{P}$. Given a driver's trace $P=<e_1, e_2, \ldots, e_k>$ and route plan $\hat{P}=<\hat{e}_1, \hat{e}_2, \ldots, \hat{e}_k>$, offCourseRatio can be defined as $$\text{OffCourseRatio}(\hat{P},P)=1-\text{Sim}(\hat{P},P).$$

with $$Sim(\hat{P}, P) = \frac{SequentialOverlap(\hat{P}, P)}{\sum_{e \in \hat{P}} len(e)}$$

being the similarity of the route plan and the driver's trace, which is measured by Jaccard similarity index. len(e) denotes the length of edge e. An exemplary implementation of SequentialOverlap is described in the following Algorithm 1.

---
Algorithm 1: SequentialOverlap
---

Input: $\hat{P}$, P
Output: Length of Overlap
1   i, j ← 0 // match $\hat{P}$(i) with $\hat{P}$(j) starting with the first element
2   match ← 0 // length of match
3   while i < size($\hat{P}$) and j < size(P) do
    |   // find the first appearance of P(j) in $\hat{P}$ with index no smaller than i
4   |   m ←FirstMatch($\hat{P}$, i, P(j))
5   |   if m >= i then
6   |   |   match ← match + len(P(j))
7   |   |_ i ← m + 1
8   |_ j ← j + 1
9   return match The more edges a determined route shares with driver's trace, the more similar the two paths are. The overlap of two paths is required to be sequential as the sequence of edges in route plan is connected in a timely order.

As can be seen, the offCourseRatio lies between 0 and 1. A value of 0 means that the two routes are completely the same while 1 means that there are totally different. An offCourseRatio value may be determined for every booking in the training data set D using the current version of the navigation map (starting with the untrained version and proceeding with a more and more fully trained navigation map). Each booking is independent and the navigation map is trained to optimize the average value of the offCourseRatio over the training data.

This means that the optimization problem solved by the training is $$\text{Min} \frac{\sum_{i \in D} offCourseRatio(i)}{N}$$

s.t.

D = training dataset

N = numbers of bookings in D $$offCourseRatio(i) = 1 - \frac{SequencialOverlap(P_i, P'_i)}{\sum_{e \in P} len(e)}$$

$P_i = <e_1, e_2, \ldots, e_k>_i$ // driver's trace $P'_i = <e_1, e_2, \ldots, e_k>'_i$ // route plan, determined by speed This means that the goal is to minimize the input training dataset's average offCourseRatio. The offCourseRatio is affected by the route plan calculated by server's route engine. The route engine is configured by the speed profile and the customized speed configuration file 113. In course of the training, the road segment speeds are repeatedly tuned and each time, for a current tuning the route engine is started to calculate a route plan from each booking's start and end point for the current tuning. Then the server calculates the offCourseRatio between the determined route plans and the routes from the training data and compares whether the current tuning has improved the offCourseRatio. If it has improved, it keeps the tuned road segment speeds. Otherwise, it reverts to the previous values (before current tuning).

As described above, the server 106 performs statistics (i.e. determines statistical information) and applies depth first search in a tree data structure and classification of the road class speed into several new speed classes.

In the tree data structure, each node (except the leaves) has three children nodes, one for each speed class "higher speed class", "equal speed class" and "lower speed class". Table 1 shows a classification strategy for classifying each road segment into one of those speed classes.

TABLE 1

| Classification Strategy | | Route Engine Route | |
|---|---|---|---|
| For each road segment | | Yes | No |
| Driver's Trace | Yes | YY –> speed is accurate | YN –> need to increase |
|  | No | NY –> need to decrease | None |

It should be noted that the server 106 performs the navigation map training under the assumption that the drivers which have chosen the routes of the training data have always chosen the fastest route they think.

As shown in table 1, for each road segment occurring in context of a booking there are three situations.

YY: If the road segment is both in a booking's route plan (determined by the route engine) and the driver's trace of the booking (from the training data), the speed is accurate for this road segment (with respect to this booking).

YN: If the road segment is in a driver's trace of a booking but not in a determined route plan for the booking, it means the current speed is slow so that route engine did not include this road segment in the route. So, this is an indication that the speed should be increased.

NY: If the road segment is in a determined route plan for a booking but not in the driver's trace for the booking, it means current speed is quick so that route engine routed to this road segment but driver did not choose it actually. So, this is an indication that the speed of the road segment should be decreased to prevent the route engine to route to this road segment.

Usually, a road segment will occur in multiple bookings (i.e. determined routes or driver trace or both of multiple bookings. Therefore, the server 106 performs statistics over the three situations YY, YN, NY of table 1, e.g. counts the numbers of bookings #YY, #YN and #NY for which YY, YN and NY, respectively, and compare the proportion to determine whether to increase the road segment's speed, keep it equal or decrease it. For example, the decision criteria to classify a road segment to a speed class may be as follows.

1. #YN/(#YY+#YN+#NY)>0.7 and #YN>threshold if YN proportion is above 70% and the absolute number is above a predetermined (e.g. input) threshold like 100, it means this road segment speed should increase in the majority of bookings. So it will allocate the road segment into higher speed class;
2. #NY/(#YY+#YN+#NY)>0.7 and NY>threshold if NY proportion is above 70% and the absolute number is a above a predetermined (e.g. input) threshold like 100, it means this road segment speed should decrease in the majority of bookings. So it will allocate the road segment into lower speed class;
3. Otherwise the road segment will be allocated to equal speed class, which means those road segments speed does not need to change in this node classification.

It should be noted that the inequalities with thresholds 0.7 for the relative numbers may also be seen as inequalities for the absolute numbers #YN and #NY with thresholds which depend on #YY+#YN+#NY by multiplying both sides with #YY+#YN+#NY (resulting in thresholds 0.7*#YY+#YN+#NY for the absolute numbers).

An exemplary implementation of the classification is described in the following Algorithm 2.

---
Algorithm 2 Statistics and Classification in one node
---

Input: node=current tuning node, minB=absolute minimum booking numbers
Output: lowNode,equalNode,highNode=3 children speed classes node
 1: New lowNode, equalNode, highNode, mark tuneDirection as 'low','equal','high' respectively
 2: node.children = [low Node,equal Node,high.Node]
 3: for each segment in node.set do
 4:     equalNums = segment.routeBookings∩segment.traceBookings // segment in both driver's trace and route plan
 5:     highNums = segment.traceBookings − segment.routeBookings // segment in driver's trace not in route plan
 6:     lowNums = segment.routeBookings − segment.traceBookings // segment in route plan not in driver's trace
 7:     total = equalNums+highNums+lowNums
 8:     if highNums/total > 0.7 and highNums > minB then
 9:        high.Node.set.Add(segment)
10:     else if lowNums/total > 0.7 and low Nums > minB then
11:        lowNode.set.Add( segment)
12:     else
13:        equalNode.set.Add(segment)
14:     end if
15: end for
16: return lowNode, equalNode, highNode

---

In Algorithm 2, the operation Add(road segment) adds the road segment to a respective child node.

Figure 2:
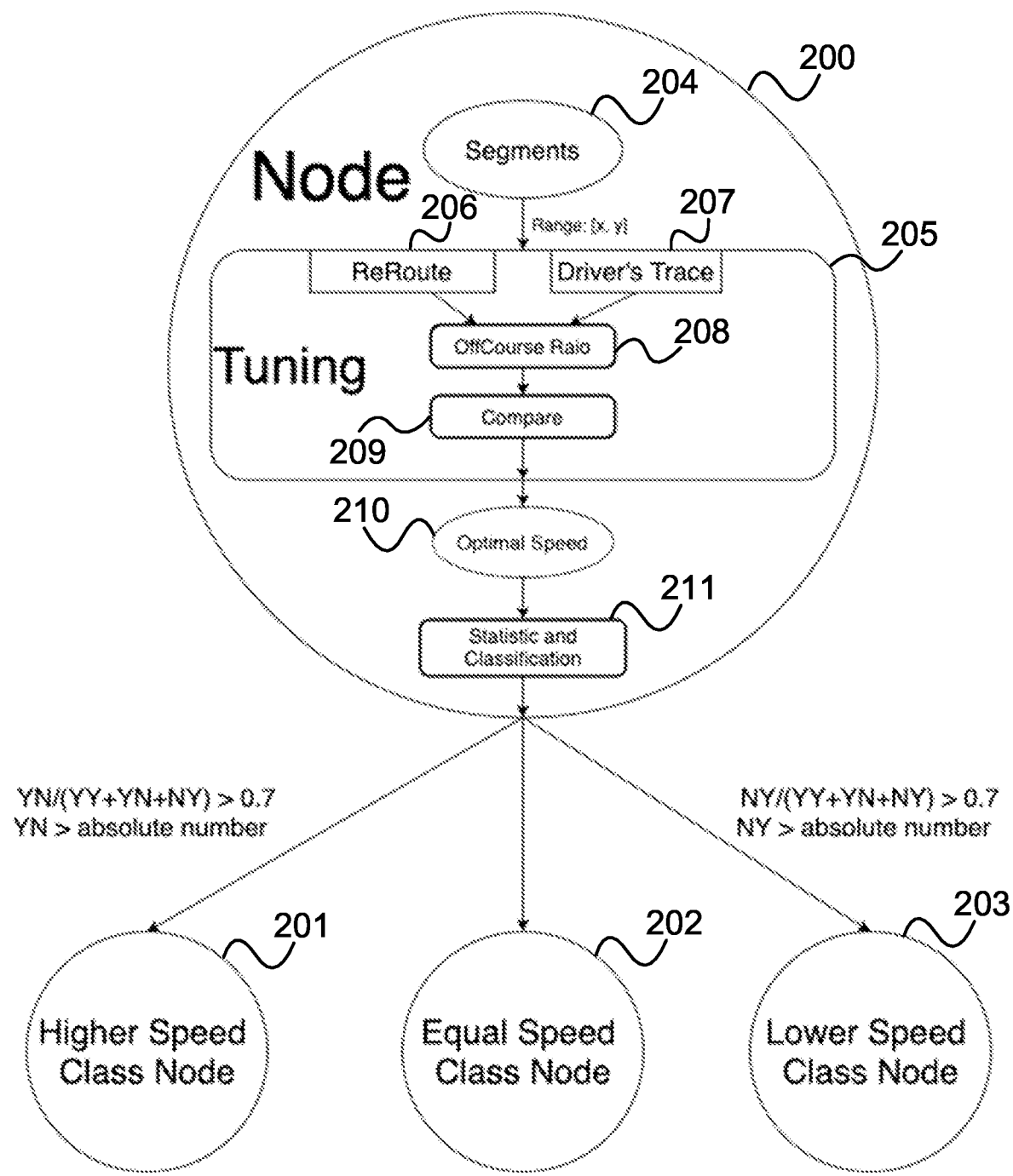
FIG. 2 illustrates a road segment speed tuning for one group of road segments.

FIG. 2 illustrates the road segment speed tuning performed for one node 200 of the tuning tree. At the start of the processing, the node contains (i.e. is associated with) a set of road segments 204 with the same (initial) speed.

Three children nodes 201, 202, 203 are defined for the node 200: a higher speed class node 201, an equal speed class node 202 and a lower speed class node 203. Each of the node 200 and the children nodes 201, 202, 203 has an identification (ID).

The speed of the node (i.e. of the set road segments 204) is tuned in 205.

For the tuning, the server 106 starts a loop with speed tuning range [x,y] (e.g., [x,y] is [−2,t]/[0,0]/[−t,2] for tuning direction "high"/"equal"/"low"; 2 or −2 is just for safeguarding; tuning direction "equal" as well as "original" means that no tuning is performed). Over the iterations of the loop, starting from the nodes initial speed, the speed of all the road segments 204 traverses the speed tuning range with respect to the original speed in the tuning direction ("high" or "low"). In each iteration of the loop, the server 106 updates the speed configuration file, starts the route engine to get a determined route plan based on the booking's start and end point, calculates the offCourseRatio in 208 (using the driver's trace 207 from the training data of the booking) and compares with the previous offCourseRatio in 209 (i.e. the offCourseRatio which results for the speed without the tuning of the present iteration). If the offCourseRatio has improved, the tuned speed of the present iteration is kept as the node's speed (possibly to be further changed in the following iterations of the loop). As a result, after all iterations, it will get an optimized speed 210 of the node's road segments 204.

In 211, after getting the optimized speed 210, the server 106 performs statistics and classifies the road segments 204 by the classification strategy described above with reference to table 1 and algorithm 2 into the three speed classes of the three children nodes 201, 202, 203. The server 106 gives the three children nodes the optimized speed 210 as initial speed and gives the tuning direction "high" to the higher speed class node 201, "equal" to the equal speed class node 202 and "low" to the lower speed class node.

An exemplary implementation of the speed tuning of a node is described in the following Algorithm 3.

---
Algorithm 3 OneNodeTuning
---

Input: node=tuning node containing set of segments, D=train data; map, step = tune step, precision=tuning offCourse ratio precision, S=iterated output file speed.csv, M=iterated offCourse ratio, R=iterated route plan,
Output: S,M,R
 1: $S_{ori} = S$, $M_{ori} = M$, $R_{ori} = R$, $Speed_{ori}$ = node.speed
 2: for δ in range [−2, step] do
 3:    if node.tuneDirection == 'high' then
 4:       node.speed += δ
 5:    end if
 6:    if node.tuneDirection == 'low' then
 7:       node.speed −= δ
 8:    end if
 9:    if node.speed > maxS or node.speed <= 0 then
10:       Continue // ignore exceeds speed
11:    end if
12:    $S_{tmp}$ = UpdateSpeedCsv(node) // update speed.csv with all the segments in the node with current node.speed
13:    $R_{tmp}$ = StartRouteEngineAndGetRoutePlan(D,map,$S_{tmp}$)
14:    $M_{tmp}$ = CalOffCourseRatio($R_{tmp}$, D)
15:    if $M - M_{tmp}$ > precision then
16:       $M = M_{tmp}$; $R = R_{tmp}$; $S = S_{tmp}$
17:    end if
18: end for
19: // if offCourse ratio iniprovement is not enough, reset arguments
20: If $M_{ori} - M$ <= precision then
21:    $S = S_{ori}$, $M = M_{ori}$, $R = R_{ori}$, node.speed = $Speed_{ori}$
22: end if
23: return S, M, R

---

Figure 3:
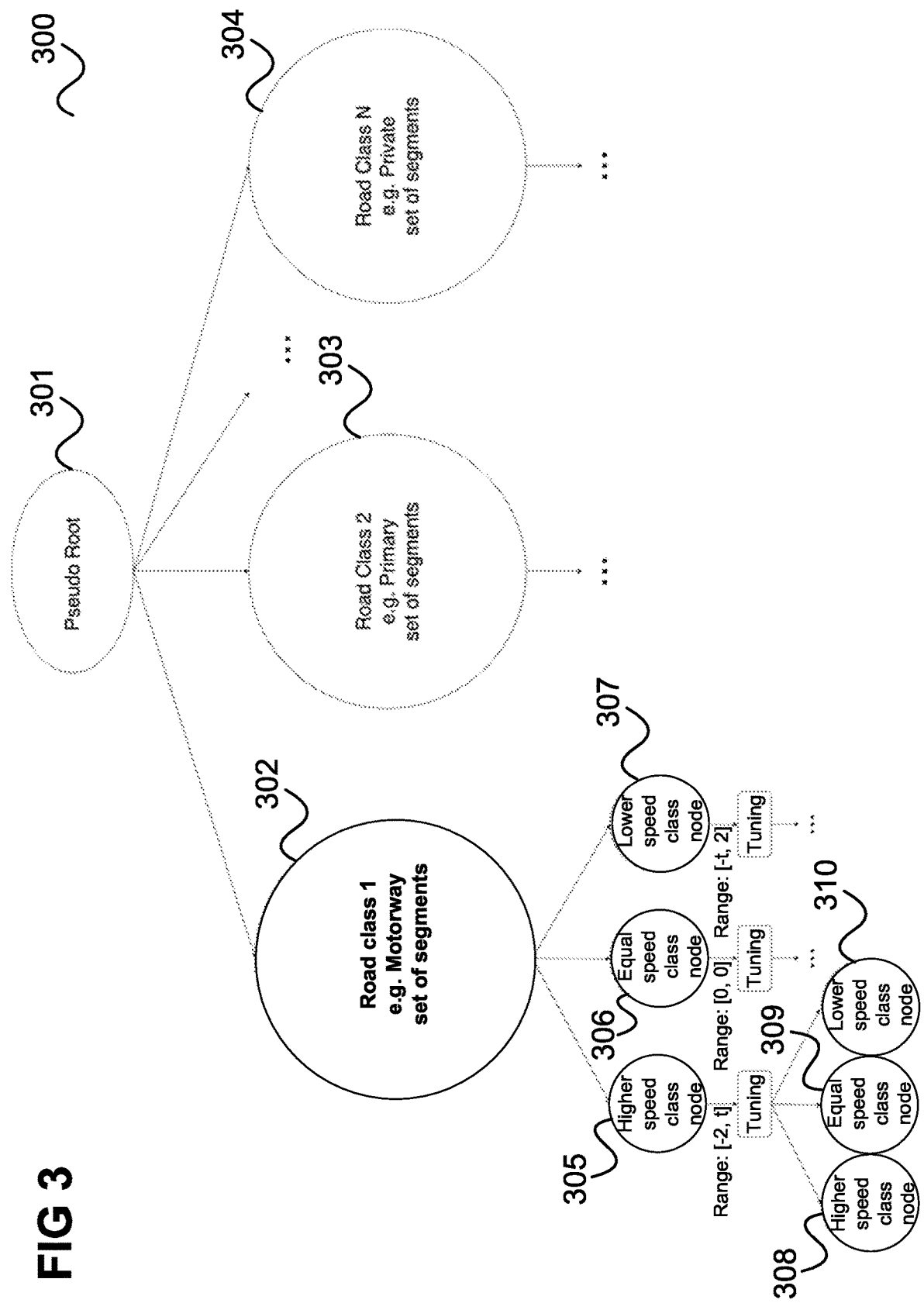
FIG. 3 illustrates a road segment speed tuning for a road network.

FIG. 3 illustrates the road segment speed tuning performed over the whole tuning tree 300.

In this example, the tuning tree 300 has, in a first layer, a pseudo root 301 (not associated with any road segments) and a second layer of nodes 302, 303, 304 and further layers, wherein, as explained above, starting from the second layer each node has three children nodes for each speed class (high, equal and low). In FIG. 3, children nodes 305, 306, 307 of the third layer, which are the children nodes of the leftmost node 302 of the second layer, are shown. Further, children nodes 308, 309, 310 of the fourth layer, which are the children nodes of the leftmost node 304 of the third layer, are shown.

The server 106 performs speed tuning over the nodes 302-310 from the root to the leaves (in a depth first search order, e.g. pre-order traversal).

According to one embodiment, on each layer, the nodes are ordered such that their speed descends from left to right.

The nodes 302, 303, 304 of the second layer are associated with the road classes, i.e. each node 302, 303, 304 of the second layer is given all road segments of roads of a certain road class. Accordingly, the server 106 does not perform speed tuning for the second layer nodes 302, 303, 304 because their speed is the road class speed as in the speed profile of the road classes. It is assumed that highways have the highest speed and influence routing the most.

Every tree node's initial speed and initial offCourseRatio is given by on its parent's optimized speed and the offCourseRatio corresponding to this optimized speed. So, once the whole tree 300 has been traversed, the result is a final offCourseRatio and road segments speed classes of all road segments, optimized for the input training data.

For equal speed class nodes 306, 309, the server performs statistics and classification but does not tune the speed because this is covered by the tuning of the parent node's speed.

There are for example three end conditions of the depth first search in the tuning tree, i.e. a node is a leaf when:
1. None of the road segments of the node is allocated into higher/lower speed class. So there's no need to tune.
2. A tuning tree depth threshold (which is e.g. an input parameter) has been reached.
3. The node tune direction is "equal" and its parent is also an "equal" speed class node, which means there is no need to perform statistics and classify the road segments because the parent node does not change its speed so it will not affect the later nodes.

When the whole tree 300 has been traversed, every leaf node represents a speed class. The server 106 generates a speed configuration file 113 which contains every tuned road segment information and speed. With this speed configuration file, the server 106 can (by means of its route engine) predict routes more accurately. The offCourseRatio is optimized for the training data.

An exemplary implementation of the speed class level routing optimization is described in the following Algorithm 4. It uses StatisticsAndClassification of Algorithm 2 and OneNodeTuning of Algorithm 3.

---

Algorithm 4 Routing Optimisation at Speed Class Level

---

```
Input: speed profile, control parameters(T = time range of data, minB =
    minimum bookings, L = whileList, city = city, wheel = wheels,
    mapversion = map version, phase = pickup or dropoff, dep = tree
    depth threshold, step = tune step, maxS = max speed, precision =
    offCourse ratio precision
Output: S:speed.csv (contains tuned segments speed)
 1: // Get original data from input parameters
 2: D = DownloadTrainingData(T, city, wheel, phase) // training data from
    cloud storage
 3: map = DownloadMap(speed profile, mapversion) // map file
 4: S = InitialSpeedCsv( ) // initialize output file, nil at begin
 5: R = StartRouteEngineAndGetRoutePlan(D, map, S) // original route
    plan
 6: M = CalOffCourseRatio(R, D) // original offCourse ratio
 7: // Initialize segment speed tree and stack
 8: New stack, tree pseudo root
 9: Classify each input booking's segments to tree node based on speed in
    ascending order, mark tuneDirection = 'original'
10: Make all the above tree nodes into its child
11: stack.Push(root, root.children)
12: // Start DFS
13: while stack is not none do
14:     node = stack.pop( )
15:     if node.tuneDirection == 'original' or 'equal' then
16:         do nothing
17:     else if node.tuneDirection == 'high' or 'low' then
18:         // In every node tuning, it will update M, R, S
19:         M, R, S=OneNodeTuning(step, D, map, tuneDirection, M, B, S, precision)
20:     end if
21:     depth = GetCurrentDepthInTree(node)
22:     // end conditions of searching down
23:     if depth == dep then
24:         Continue
25:     else if node.tuneDirection == 'equal' and node.parent != nil and
        node.parent.tuneDirection == 'equal' then
26:         Continue
27:     end if
28:     // Statistics and Classification, it will generate 3 children nodes
29:     lowNode, equalNode, highNode = StatisticsAndClassification(node, minB)
30:     stack.Push(lowNode, equalNode, highNode)
31: end while
32: return S
```

By the above process, the road class speed is split into several road segment speed classes after tuning. There is a risk that navigation using these speed classes overfits, which means a determined route may not be smooth which results in that drivers may have to take turns a lot of times. So in order to avoid overfitting, according to one embodiment, a regularization term is used which measures the smoothness:

$$\text{smoothness factor} = \sum_{(i,j) \leftrightarrow (k,l)} \left| \frac{1}{v_{(i,j)}} - \frac{1}{v_{(k,l)}} \right| \frac{2}{d_{(i,j)} + d_{(k,l)}}$$

As the formula showed above, two road segments (i,j) and (k,l) are called neighboring when they represent consecutive or intersecting roads. The neighbouring relationship is written as $(i,j) \leftrightarrow (k,l)$. $v_{(i,j)}$ corresponds to the speed in kilometers per hour of the road segment (i,j). $d_{(i,j)}$ represents the length in meters of the road segment (i,j). $\Sigma_{(i,j) \leftrightarrow (k,l)}$ represent the sum over all pairs of neighbouring road segments (i,j) and (k,l) in the road segments occurring in the training dataset. The weighting factor $2/(d_{(i,j)} + d_{(k,l)})$ ensuring that continuity is more important in shorter neighbouring roads (where constant velocity is a better approximation) than in longer ones. In other words, the smaller the smoothness factor is, the smoother the navigation map is.

If the smoothness factor becomes worse after speed tuning (of some nodes or after performing the complete route optimization), the server 106 may adjust the controlling parameters and re-tune until it gets better. Thus, it can avoid overfitting while optimizing the road network navigation.

Figure 4:
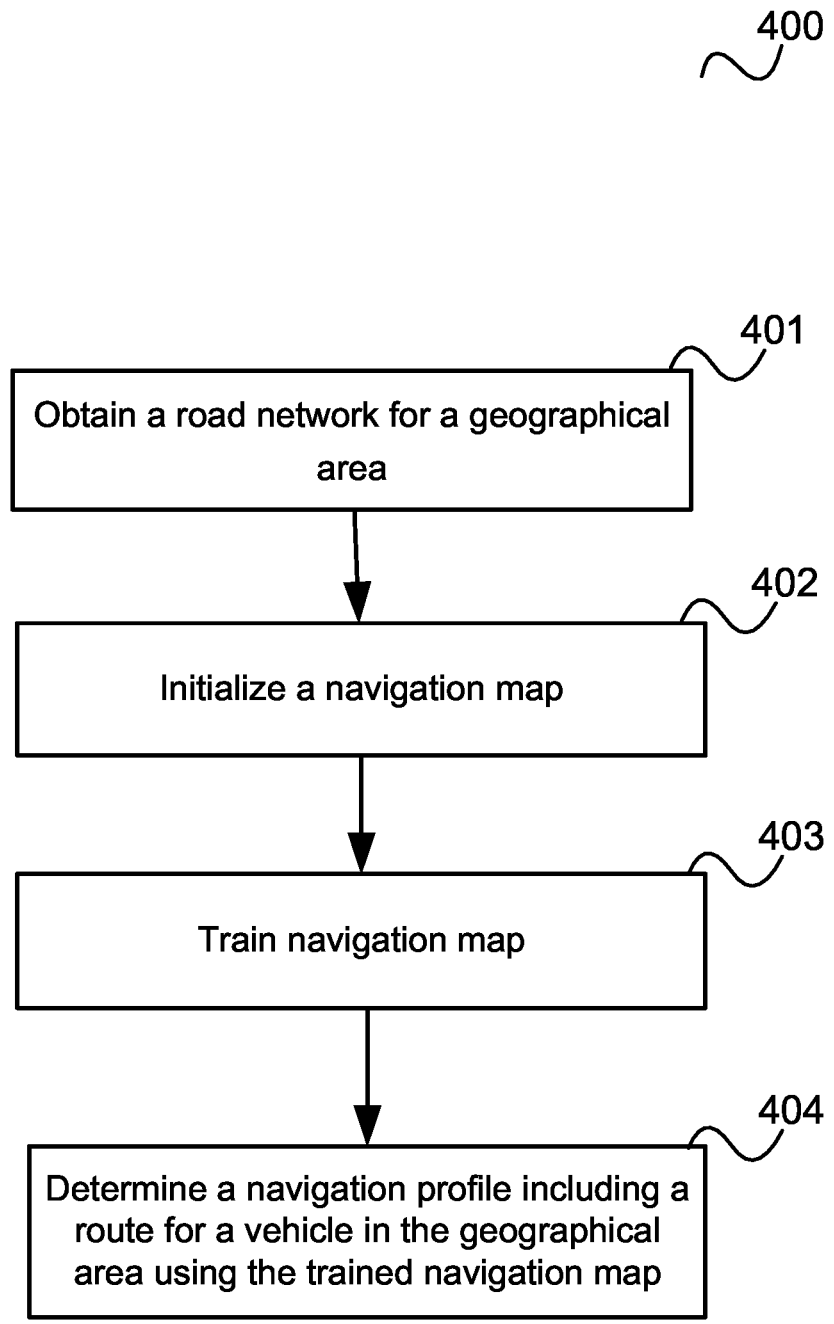
FIG. 4 shows a flow diagram illustrating a method for according to an embodiment.

In summary, according to various embodiments, a method is provided as illustrated in FIG. 4.

FIG. 4 shows a flow diagram 400 illustrating a method for determining a navigation profile for a vehicle in a geographical area.

In 401, a road network is obtained for the geographical area, the road network including road segments connecting locations in the geographical area.

In 402, a navigation map is initialized by assigning an initial speed to each road segment of the road network (wherein the initial speed is for example given by the speed of a road class of a road of which the road segment is part).

In 403, the navigation map is trained using training data including a training route for each of a multiplicity of trips by, Determining whether a number of trips for which a road segment is in the training route but not in the determined route is above a first threshold and, if the number of trips for which a road segment is in the training route but not in the determined route is above the first threshold, assigning a higher speed to the road segment and Determining whether a number of trips for which a road segment is in the determined route but not in the training route is above a second threshold and, if the number of trips for which a road segment is in the determined route but not in the training route is above the second threshold, assigning a lower speed to the road segment.

In 404, a navigation profile including a route for a vehicle in the geographical area using the trained navigation map is determined.

According to various embodiments, in other words, the speed or road segments which are seldomly taken by drivers is decreased while the speed of road segments which are often taken by drivers are increased. Thus, road segment speed is used as a parameter indicating how suitable (or popular) a road segment is for a trip. Having trained these road segments speeds allows efficient navigation through the geographical area. Training the navigation map may be seen as learning from demonstrations, i.e. training a machine learning model from demonstrations, wherein in this example the demonstrations are routes taken by drivers and the machine learning model is trained to come up with routes for trips itself. It may determine the route of a trip from the trained navigation map by means of a shortest-path algorithm which takes into account road segment speeds (i.e. an algorithm which calculates a shortest path between vertices taking into account edge weights). So, the machine learning model that is trained can be seen to include the navigation map and the route engine and it is trained to come up with similar routes as the ones of the training data (and to generalize to unseen trips).

Thus, the method of FIG. 4 may be part of a method for controlling a vehicle (or controlling the navigation of a vehicle) wherein the trained navigation data is provided to a vehicle and the vehicle (or its navigation system) is controlled using the trained navigation map data.

For example, the route to take for a trip may be determined by the server 106 and transmitted to the respective vehicle 108, i.e. the vehicle assigned to the trip, such that the driver may follow the route. In case of an autonomous vehicle the vehicle may be controlled according to the determined route. The server 106 calculates the route using a navigation map, stored in data base 107.

The term navigation profile may refer to a route given to a vehicle for navigating the vehicle or to the prediction of a route the vehicle will take.

The various data like the navigation map, the road network and the training data are electronic data and the method may be computer-implemented.

Figure 5:
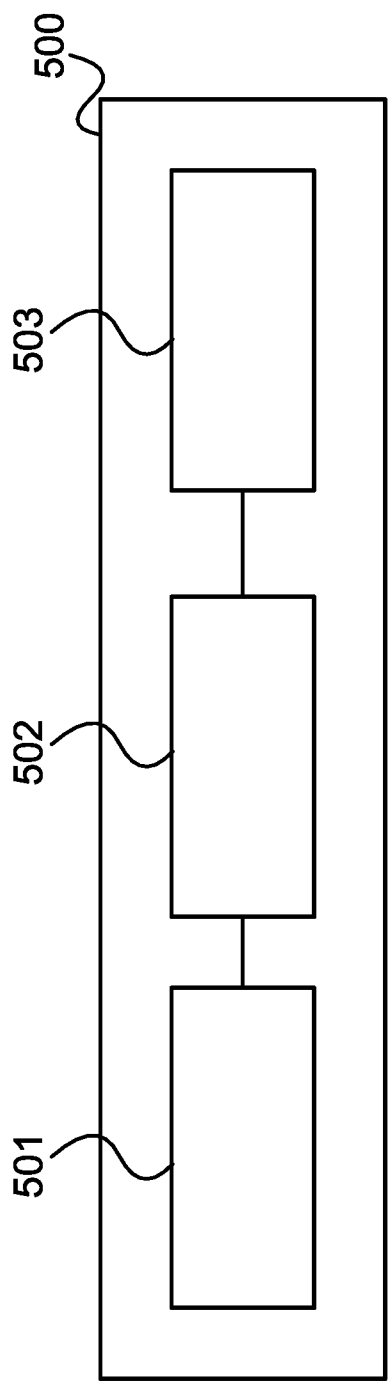
FIG. 5 shows a server computer according to an embodiment.

The method of FIG. 4 is for example carried out by a server computer as illustrated in FIG. 5.

FIG. 5 shows a server computer 500 according to an embodiment.

The server computer 500 includes a communication interface 501 (e.g. configured to receive drivers' traces or the specification of a road network or to transmit navigation map data or navigation profiles to another server (e.g. a navigation server) or a navigation device in a vehicle). The server computer 500 further includes a processing unit 502 and a memory 503. The memory 503 may be used by the processing unit 502 to store, for example, driver's traces and a road network to be processed. The server computer is configured to perform the method of FIG. 4.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for determining a navigation profile for a vehicle in a geographical area, comprising:
   obtaining a road network for the geographical area, the road network comprising a plurality of road segments connecting one or more locations in the geographical area, wherein each of the plurality of road segments may be assigned one of (i) a higher speed, (ii) a lower speed, and (iii) an equal speed group;
   initializing a navigation map by assigning an initial speed to each road segment of the plurality of road segments in the road network;
   training the navigation map using training data comprising a training route for each of a plurality of trips by,
      identifying a determined route within the road network, the determined route including a number of road segments;
      determining whether a number of trips for which a road segment of the plurality of road segments in the road network is in the training route but not in the determined route is above a first threshold and, if the number of trips for which a road segment of the plurality of road segments in the road network is in the training route but not in the determined route is above the first threshold, assigning a higher speed to the road segment of the plurality of road segments in the road network,
      determining whether a number of trips for which a road segment of the plurality of road segments in the road network is in the determined route but not in the training route is above a second threshold and, if the number of trips for which a road segment of the plurality of road segments in the road network is in the determined route but not in the training route is above the second threshold, assigning a lower speed to the road segment of the plurality of road segments in the road network; and
   determining a navigation profile including a route for a vehicle in the geographical area using the trained navigation map; and
   transmitting the determined navigation profile to a vehicle and controlling the vehicle to follow the route included in the navigation profile.

2. The method of claim 1, wherein the first threshold and the second threshold depend on the number of trips for which the road segment of the plurality of road segments in the road network is in the determined route, the training route or both.

3. The method of claim 1, comprising:
   determining whether the number of trips for which a road segment of the plurality of road segments in the road network is in the training route but not in the determined route is above the first threshold and a third threshold and, if the number of trips for which a road segment of the plurality of road segments in the road network is in the training route but not in the determined route is above the first threshold and the third threshold, assigning a higher speed to the road segment of the plurality of road segments in the road network, and determining whether the number of trips for which a road segment of the plurality of road segments in the road network is in the determined route but not in the training route is above the second threshold and a fourth threshold and, if the number of trips for which a road segment of the plurality of road segments in the road network is in the determined route but not in the training route is above the second threshold and the fourth threshold, assigning a lower speed to the road segment of the plurality of road segments in the road network,
   wherein the first threshold and the second threshold are absolute thresholds and wherein the third threshold and the fourth threshold are relative thresholds depending which depend on the number of trips for which the road segment of the plurality of road segments in the road network is in the determined route, the training route or both.

4. The method of claim 1, wherein initializing the navigation map comprises assigning each road segment of the plurality of road segments in the road network to a road segment speed group, wherein each road segment speed group is classified as one of (i) a higher speed, (ii) a lower speed, and (iii) an equal speed; and
   wherein iteratively training the navigation map comprises for each road segment speed group,
      determining an average deviation between the routes determined using the navigation map and the training routes and tuning the speed of the road segment speed group to reduce the average deviation and, for each road segment of the plurality of road segments in the road segment speed group,
         determining whether a number of trips for which a road segment of the plurality of road segments in the road network is in the training route but not in the determined route is above the first threshold and assigning the road segment of the plurality of road segments in the road network to a road segment speed group for a higher speed than the speed of the road segment speed group if the number of trips for which the road segment of the plurality of road segments in the road network is in the training route but not in the determined route is above the first threshold; and
         determining whether a number of trips for which a road segment of the plurality of road segments in the road network is in the determined route but not in the training route is above the second threshold and assigning the road segment of the plurality of road segments in the road network to a road segment speed group for a lower speed than the speed of the road segment speed group if the number of trips for which the road segment of the plurality of road segments in the road network is in the determined route but not in the training route is above the second threshold.

5. The method of claim 4, further comprising, if neither the number of trips for which the road segment of the plurality of road segments in the road network is in the training route but not in the determined route is above the first threshold nor a number of trips for which the road segment of the plurality of road segments in the road network is in the determined route but not in the training route is above the second threshold, assigning the road segment of the plurality of road segments in the road network to a road segment speed group having the same speed as the road segment speed group the road segment of the plurality of road segments in the road network is from.

6. The method of claim 4, wherein tuning the speed of the road segment speed group comprises tuning the speed within a tuning range.

7. The method of claim 4, wherein if the road segment speed group is a road segment speed group for a higher speed tuning the speed of the road segment speed group comprises increasing the speed of the road segment speed group.

8. The method of claim 4, wherein if the road segment speed group is a road segment speed group for a lower speed tuning the speed of the road segment speed group comprises decreasing the speed of the road segment speed group.

9. The method of claim 4, comprising generating a tuning tree having a node for each road segment speed group, wherein iteratively training the navigation map comprises traversing the nodes of the tuning tree in a depth first search order and perform, when a node is being traversed, for the road segment speed group of the node, the tuning of the speed of the road segment speed group and, for each road segment of the plurality of road segments in the road network in the road segment speed group of the node, the determining whether a number of trips for which a road segment of the plurality of road segments in the road network is in the training route but not in the determined route is above the first threshold and the assigning the road segment of the plurality of road segments in the road network to a road segment speed group for a higher speed than the speed of the road segment speed group if the number of trips for which the road segment of the plurality of road segments in the road network is in the training route but not in the determined route is above the first threshold and the determining whether a number of trips for which a road segment of the plurality of road segments in the road network is in the determined route but not in the training route is above the second threshold and the assigning the road segment of the plurality of road segments in the road network to the road segment speed group if the number of trips for which the road segment of the plurality of road segments in the road network is in the determined route but not in the training route is above the second threshold.

10. The method of claim 9, comprising, when a node is being traversed, generating a child node for a road segment speed group for a higher speed and generating a child node for a road segment speed group for a lower speed except for leaf nodes of the tuning tree.

11. The method of claim 1, further comprising evaluating the smoothness of the trained navigation map and re-training the navigation map if evaluation of a smoothness factor indicates that the smoothness of the trained navigation map has worsened by more than a predetermined maximum amount in the training or over a predetermined number of iterations of the training.

12. The method of claim 1, wherein obtaining the road network for the geographical area comprises obtaining information about the location of roads in the geographical area and subdividing the roads into the road segments of the plurality of road segments in the road network.

13. The method of claim 12, wherein the locations in the geographical area connected by the road segments of the plurality of road segments in the road network are crossings of the roads and subdividing the roads into road segments comprises subdividing the roads at the crossings.

14. The method of claim 1, further comprising navigating one or more vehicles by the determined navigation profile.

15. A server computer comprising a radio interface, a memory interface and a processing unit configured to perform the method of 1.

16. A non-transitory computer program element comprising program instructions, which, when executed by one or more processors, cause the one or more processors to perform the method of claim 1.

17. A non-transitory computer-readable medium comprising program instructions, which, when executed by one or more processors, cause the one or more processors to perform the method of claim 1.

* * * * *